United States Patent
Pradhan et al.

(10) Patent No.: US 7,287,078 B2
(45) Date of Patent: Oct. 23, 2007

(54) RESTORATION OF LOST PEER-TO-PEER OFFLINE TRANSACTION RECORDS

(75) Inventors: Salil Pradhan, Santa Clara, CA (US); Christophe Gouguenheim, Mountain View, CA (US); Cyril Brignone, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 796 days.

(21) Appl. No.: 10/714,379

(22) Filed: Oct. 31, 2003

(65) Prior Publication Data

US 2005/0096993 A1    May 5, 2005

(51) Int. Cl.
  *G06F 15/173* (2006.01)
  *G06F 15/16* (2006.01)
(52) U.S. Cl. .......... 709/225; 709/202; 709/226; 709/229; 705/75; 707/202; 714/2; 714/100
(58) Field of Classification Search ........ 709/202–203, 709/225–226, 229; 707/202–204; 705/75; 714/2–4, 15, 20, 25, 100
See application file for complete search history.

(56) References Cited

U.S. PATENT DOCUMENTS

| | | | |
|---|---|---|---|
| 5,721,918 A * | 2/1998 | Nilsson et al. ........... 707/202 |
| 5,819,226 A * | 10/1998 | Gopinathan et al. ........ 705/44 |
| 5,915,022 A * | 6/1999 | Robinson et al. ........... 705/75 |
| 6,070,795 A | 6/2000 | Feiken |
| 6,112,987 A | 9/2000 | Lambert et al. |
| 6,144,999 A * | 11/2000 | Khalidi et al. ............ 709/219 |
| 6,199,762 B1 | 3/2001 | Hohle |
| 6,282,649 B1 | 8/2001 | Lambert et al. |
| 6,330,546 B1 * | 12/2001 | Gopinathan et al. ......... 705/35 |
| 6,341,169 B1 * | 1/2002 | Cadorette et al. .......... 382/115 |
| 6,535,997 B1 * | 3/2003 | Janson et al. ............. 707/202 |
| 6,718,481 B1 * | 4/2004 | Fair ........................ 709/224 |
| 6,922,792 B2 * | 7/2005 | Moser et al. .............. 707/202 |
| 7,031,986 B2 * | 4/2006 | Ito ........................ 707/204 |
| 7,219,260 B1 * | 5/2007 | de Forest et al. ........... 714/15 |

OTHER PUBLICATIONS

Pradhan, Salil; Gouguenheim, Christophe; Serra, Bill; U.S. Appl. No. 10/428,810, filed May 1, 2003.
Zhang, Kan; Brignone Cyril; Gouguenheim, Christophe; Kitson, Fred; Pradhan, Salil; Recker, John; Serra, Bill; "FluidMedia: an offline peer-to-peer media transaction system," Hewlett-Packard Technical Reports, HPL-2002-342, Dec. 12, 2002.

* cited by examiner

*Primary Examiner*—Bharat Barot (57) ABSTRACT

The invention provides for restoration of lost peer-to-peer offline transaction records. The lost offline transaction records may include access rights to digital media. In one embodiment, a demand for restoration of a plurality of lost peer-to-peer offline transaction records is made. In response, an attempt is made to verify each transaction for the plurality of lost transaction records. This attempt is made through another party to the corresponding transaction. An accuracy indicator is assigned to each transaction to indicate whether the transaction is verified directly through another party to the corresponding transaction. A determination is made as to whether each transaction record of the plurality of lost transaction records should be restored based on the assigned accuracy indicators.

28 Claims, 5 Drawing Sheets

Transaction Log

RESTORATION OF LOST PEER-TO-PEER OFFLINE TRANSACTION RECORDS

FIELD OF THE INVENTION

The present invention relates to the field of peer-to-peer networks and, more particularly, to restoration of lost peer-to-peer transaction records.

BACKGROUND OF THE INVENTION

Music and video content is increasingly being distributed via the Internet. Recent advances in audio and video compression, higher bandwidth Internet connections, and the decreasing cost of memory have made it practical for users to download audio and video content via the Internet to personal computers and other dedicated digital devices. The downloaded content can also be transferred to compact disks (CDs), mini-disks or digital video disks and played on other audio and video devices such as MP3-format digital players. MP3 (MPEG Audio Layer 3) format is a compression system for digital music that helps reduce the size of a digitized song without significantly degrading the sound quality.

Digital music converted to MP3 format is currently available on the World Wide Web for individual use. MP3 files can be downloaded from the Internet using a computer and special software. Furthermore, a personal computer programmed with appropriate software can convert digital music from a CD to MP3 format. Currently, MP3 files can be played in different ways: an MP3 file can be played directly on a personal computer; an MP3 file can be decompressed and recorded onto CD; and an MP3 file can be played on an MP3 player. MP3 players are relatively small, lightweight, portable devices that can interface with a personal computer. Thus, a user can download MP3 files from the Internet and load such MP3 files onto the MP3 player. Typically, the MP3 player can be connected to a personal computer's parallel or USB port in order to receive the downloaded MP3 files.

The practice of downloading media from the Internet, particularly music, has been the source of much controversy. Peer-to-peer software such as Napster, Morpheus and Kaza has been utilized to provide consumers with the ability to freely share copyrighted digital media. In a sense, such software makes it possible for consumers to arguably commit intellectual property theft with relative ease. As a result, consumers have little or no motivation to go a record store and purchase CDs, albums or the like when they can simply download the desired music via a web site. Needless to say, media providers, as well as creators of the music, are opposed to such practices since they do not receive any financial compensation when the copyrighted digital media is downloaded and transferred between users.

Accordingly, what is needed are techniques for addressing problems related to the peer-to-peer transaction of digital media. It is toward these ends that the present invention is directed.

SUMMARY OF THE INVENTION

The invention provides for restoration of lost peer-to-peer offline transaction records. The lost transaction records may include access rights to digital media. In one embodiment, a demand for restoration of a plurality of lost peer-to-peer transaction records is made. In response, an attempt is made to verify each transaction for the plurality of lost transaction records. This attempt is made through another party to the corresponding transaction. An accuracy indicator is assigned to each transaction to indicate whether the transaction is verified directly through another party to the corresponding transaction. A determination is made as to whether each transaction record of the plurality of lost transaction records should be restored based on the assigned accuracy indicators.

These and other aspects of the present invention are described in more detail herein.

DETAILED DESCRIPTION OF A PREFERRED EMBODIMENT

The invention provides for restoration of lost peer-to-peer transaction records. The invention is particularly useful where rights to access content are received from a content provider, transferred in an online or offline manner among peers in exchange for tokens representing license fees and electronically stored. For example, the access rights may be stored as transaction records in a portable device, such as a smart card. In the event of a loss of the records, e.g., where the portable device fails or is lost, it would be desired to restore the transaction records without the party having to re-purchase the rights for which tokens had already been exchanged. Such a system is described in U.S. application Ser. No. 10/428,810, filed May 1, 2003, still pending the entire contents of which are hereby incorporated by reference. The lost transaction records may include access rights to digital media.

In one embodiment, a demand for restoration of a plurality of lost peer-to-peer transaction records is made. In response, an attempt is made to verify each transaction for the plurality of lost transaction records. This attempt is made through another party to the corresponding transaction. An accuracy indicator is assigned to each transaction to indicate whether the transaction is verified directly through another party to the corresponding transaction. A determination is made as to whether each transaction record of the plurality of lost transaction records should be restored based on the assigned accuracy indicators.

Selected ones of the lost transaction records may then be restored. Restoration may only be of those transaction records that are verified directly. At least one of the lost transaction records may be restored before the transaction is verified through the other party to the transaction. A log of transaction records may be received from each other party to the transactions for the lost transaction records whose record of the transaction is not lost; verification of the transaction records is based on the received logs.

The accuracy indicator may further indicate whether the transaction record for a transaction is verified indirectly through another party to the corresponding transaction and, if so, the accuracy indicator may also indicate the number of parties through which the transaction is verified indirectly. Restoration may be only of those transaction records that are verified directly and those that are verified indirectly through one other party.

The determination of whether to restore lost transaction records may be further based on a history for the party making the demand. The history for the party may indicate verified and unverified transactions. The history for the party may include a ratio of a number of verified transactions to a number of lost transactions. When the ratio exceeds a threshold, at least one of the lost transaction records may be restored before the transaction is verified through the other party to the transaction. The party may be blacklisted when the number of unverified transactions exceeds a threshold. When the party is blacklisted, only those transaction records that are verified directly may be restored.

Figure 1:
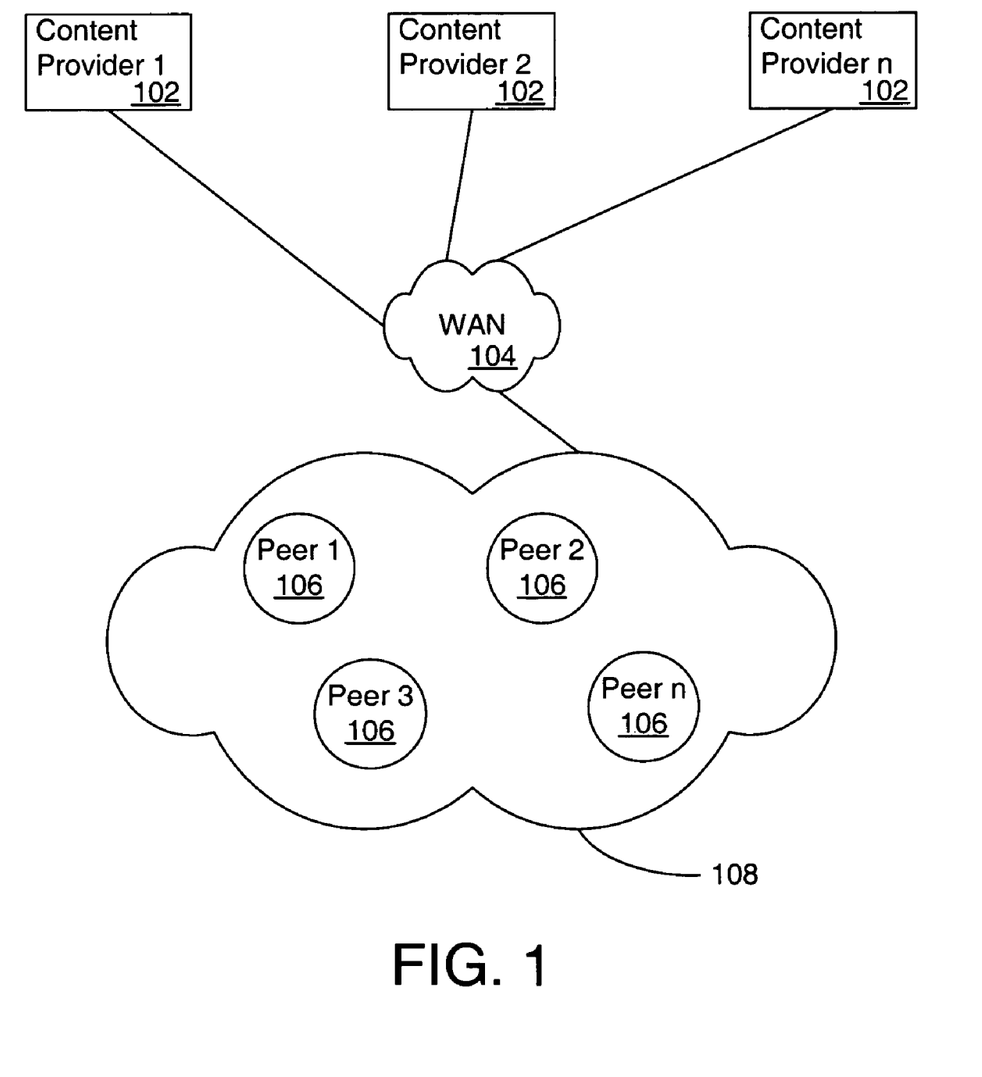
FIG. 1 illustrates a peer-to-peer network in which the present invention may be implemented.

FIG. 1 illustrates a peer-to-peer network in which the present invention may be implemented. As shown in FIG. 1, one or more content providers 102 may be accessible via a wide area network (WAN) 104, such as the Internet. A number of peer devices 106 may access the WAN 104 or other peer devices 106 via local connections 108. Thus, a peer device 106 may purchase access rights to content from a content provider 102 and transfer the access rights to another peer device 106. While not shown, intermediate servers, referred to as "hot spots" may provide an interface between the content providers 102 and the peer devices 106. It will be apparent that other modifications may be made to the network.

An access right can be considered a license to use to the corresponding content. The access rights may be transferred to a among the peer devices 106 by the exchange of tokens, which represent monetary value, and the access rights, e.g., in the form of a password or decryption key, that enables use of the licensed content.

In an embodiment, the peer devices 106 include media cards that incorporate smart card technology. Generally speaking, smart cards are wallet-sized (or smaller) cards incorporating a microprocessor or microcontroller to store and manage data within the card. More complex than magnetic-stripe and stored-value cards, smart cards generally include memory management and security features. Multi-function cards, for example, are often configured to support credit, debit, stored value, loyalty, and a number of other applications all within a single card. A typical multi-function smart card includes a microcontroller embedded within the card plastic which is electrically connected to an array of external contacts provided on the card exterior.

The smart card microcontroller generally includes an electrically-erasable and programmable read only memory (EEPROM) for storing user data, random access memory (RAM) for scratch storage, and read only memory (ROM) for storing the card operating system. Relatively simple microcontrollers are generally adequate to control these functions. Thus, it is not unusual for smart cards to utilize 8-bit, 5 MHZ microcontrollers with about 8K of EEPROM memory (for example, the Motorola 6805 or Intel 8051 microcontrollers).

A number of standards have been developed to address various aspects of smart cards, e.g.: ISO 7816-1, Part 1: Physical characteristics (1987); ISO 7816-2, Part 2: Dimensions and location of the contacts (1988); ISO 7816-3, Part 3: Electronic signals and transmission protocols (1989, Amd. 1 1992, Amd. 2 1994); ISO 7816-4, Part 4: Interindustry commands for interchange (1995); ISO 7816-5, Part 5: Numbering system and registration procedure for application identifiers (1994, Amd. 1 1995); ISO/IEC DIS 7816-6, Inter-industry data elements (1995); ISO/IEC WD 7816-7, Part 7: Enhanced inter-industry commands (1995); and ISO/IEC WD 7816-8, Part 8: Inter-industry security architecture (1995). These standards are hereby incorporated by reference.

Figure 2:
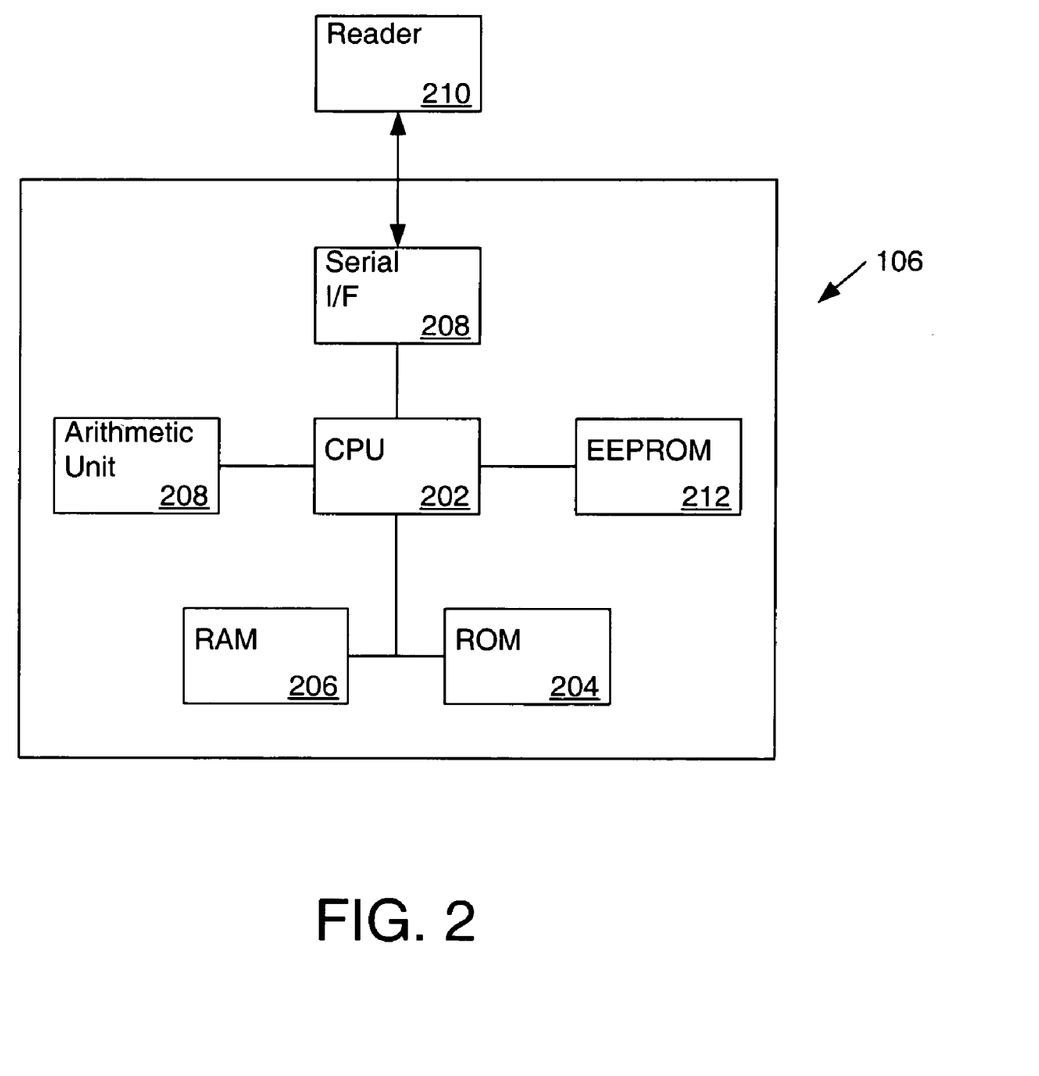
FIG. 2 illustrates a media card by which the present invention may be implemented.

FIG. 2 illustrates a media card device that could be utilized in conjunction with a method in accordance with an embodiment of the present invention. The media card may serve as a peer device 106 (FIG. 1) and includes a central processing unit 202 (CPU) which is connected to a read only memory 204 (ROM), primarily used for storage of an operating system. A random access memory 206 (RAM) is also provided for volatile storage of data, particularly for program execution. The CPU 202 is operatively coupled to a serial interface 208 that in turn communicates with a card reader 210 according to techniques well known in the art.

The CPU 202 is connected to an arithmetic logic unit 210, for example, one suitable for processing large keys (512 byte keys, 1024 current RSA). An electrically erasable programmable read only memory 212 (EEPROM) is provided, which typically stores system files and applications. The media card could be a Compaq flash card or memory stick.

In an embodiment of the present invention, the media card is obtained (usually purchased) by a user and is utilized to obtain access rights for different types of media. For the purposes of this patent application, an access right can be thought of as a pseudo-license to use the associated media. These access rights can be purchased with the media card whereby the media card is subsequently used in conjunction with a media-playing device to access the media. For example, at the time the user purchases the media card, the user can also purchase a number of digital tokens or any other medium of exchange, which can be later used to purchase access rights to media. For the purposes of identifying/authenticating users of media cards, a unique digital certificate can be stored into the card for the purpose of authenticating/identifying a user. Additionally, for an added security measure, a requirement could be established whereby the certificates have to be renewed after a predetermined amount of time (once a month, once a quarter, etc.) or after a predetermined number of transactions.

Once a media card device acquires the access rights to a particular media content, the media card can be used in conjunction with a media-playing device to play the selected media. For example, if the purchased media is a particular song, the media card can be inserted into a reader 210 of a juke box and the user will be able to play the particular song. In an alternate embodiment, the media card can be utilized to play the media via a separate media-playing device such as an MP3 player.

Furthermore, to make it possible to perform offline transactions, that is transactions made disconnected from the Internet infrastructure, a transaction log is maintained on the media card (e.g., in memory 212) whereby each transaction made offline with the media card is recorded and stored in a local file. Accordingly, a user can defer the payment of the fee to the provider of the media when he performs an offline transaction. When this user attempts to renew the card, i.e. renew the unique certificate, the system will check his transaction log and ask him to pay for his transactions made offline. If the transactions are pre-paid by advance purchase of tokens the system may check the remaining number of tokens and offer to sell additional ones. Thus, each user is required to periodically upload their transaction log to the content provider 102 (FIG. 1).

Figure 3:
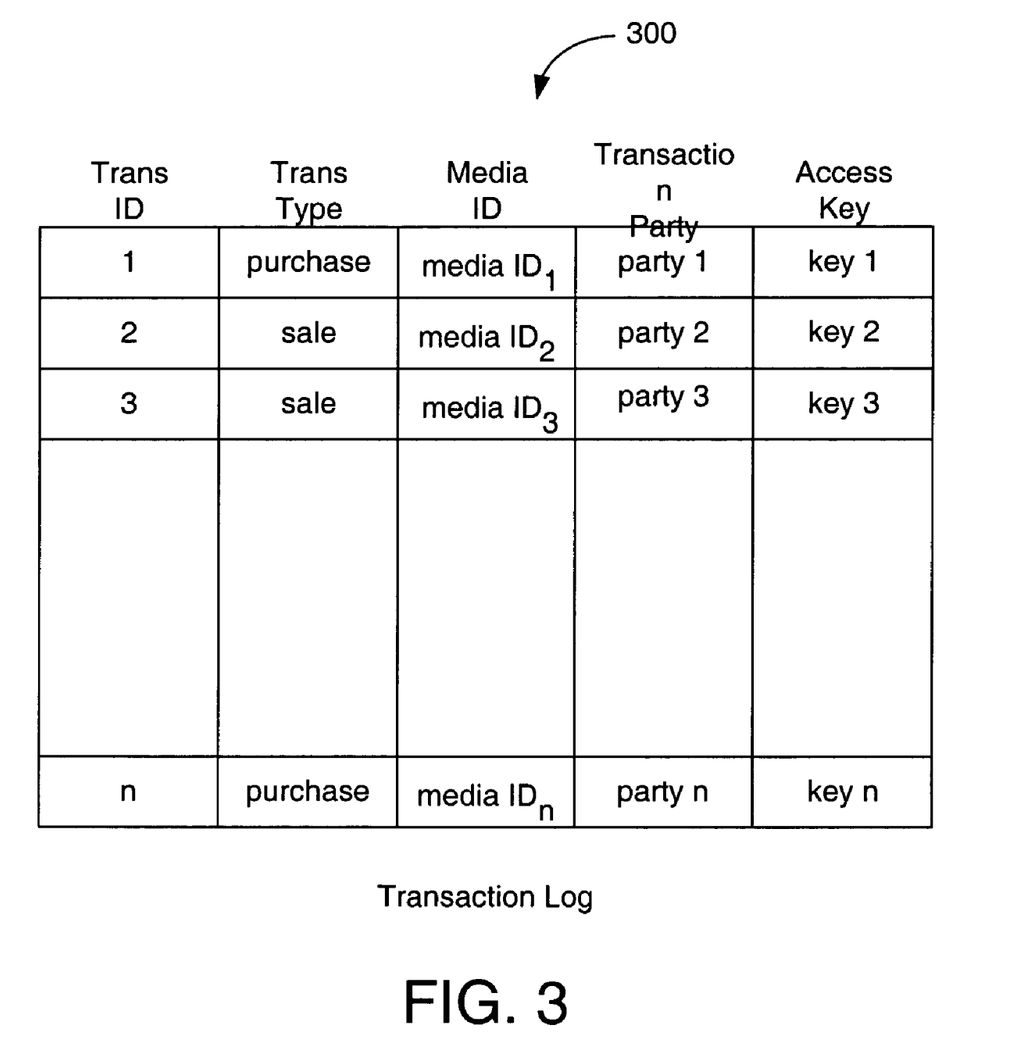
FIG. 3 illustrates a transaction log in accordance with an embodiment of the present invention.

FIG. 3 illustrates an exemplary transaction log 300 in accordance with an embodiment of the present invention. Each peer device 106 has its own transaction log 300 which represents a history of transactions it has participated in. The transaction log includes a record of each transaction by which access rights have been transferred to or from the corresponding peer device 106 (FIG. 1).

As shown in FIG. 3, each record may occupy a row in the log 300 and may include: a transaction identifier (e.g., a unique number assigned to each transaction); a transaction type, which specifies whether the media content was purchased or sold by the peer device 106 for the log 300; a media identifier, which identifies the particular media (e.g., a particular song); a transacting party identifier, which identifies the other party to transaction (i.e. the party from whom access rights were purchased or to whom access rights were sold); and an access key, which allows the corresponding content to be accessed. It will be apparent that the arrangement of elements of the transaction log is exemplary and that items can be omitted or added. For example, the log 300 may also include a purchase price (e.g., in tokens) for the transaction.

Occasionally, a peer device 106 (e.g., a media card) may fail. For example, a hardware failure of a media card may render the device inoperable. Further, a peer device 106 may be lost or stolen. In either case, the transaction log 300 is lost. If offline transactions have occurred since the transaction log 300 has been uploaded, the content provider 102 will not have received a record of those transactions from the device that would enable to content provider 102 to restore the access rights to the user. However, the user will have expended tokens to acquire the access rights. This presents a problem in that it would be desirable to only restore those access rights that the user has actually purchased. In addition, in the case of sales, it would be desirable to restore any commissions due to a seller if the seller's transaction log is lost.

Thus, the invention provides for restoration of lost peer-to-peer transaction records. This is accomplished based on the circumstance that while performing transactions, a user interacts with other users. When a user loses their peer device 196 (which may be media card) or it fails, portion of the log of those transactions remain on the media cards of the other users with whom the transactions were made. This information can generally be used to reconstitute at least portions of the user's transaction log.

For example, assume that a user U purchases some media content. User U buys content C1 from user U1, content C2 from user U2 and content C3 from the user U3. Then user U loses their media card. User U contacts the content provider and makes a demand for restoration of the media contents: "I lost the contents C1, C2 and C3—can you please give me them back?"

In response, the content provider may give those contents (by providing the corresponding access rights to the user U without charging any additional fees. But it records this "gift" in its files. At some time, each of the users U1, U2 and U3 will upload their transaction logs to the content provider, for example, by visiting a point-of-sale location. The content provider may then verify from those transaction logs that the users U1, U2 and U3 performed transactions with user U that match the claim of user U.

Content provider may then retain of record of whether the claimed transactions can be verified or not for future use should the user make a claim in the future. This record is an indicator of the accuracy of the user's claims. For example, if the accuracy indicator indicates that the user's previous claims had a high degree of accuracy, the content provider may be more likely to provide requested content before a transaction of a current claim can be verified by the transaction log of another user or when the transaction cannot be so verified.

Figure 4:
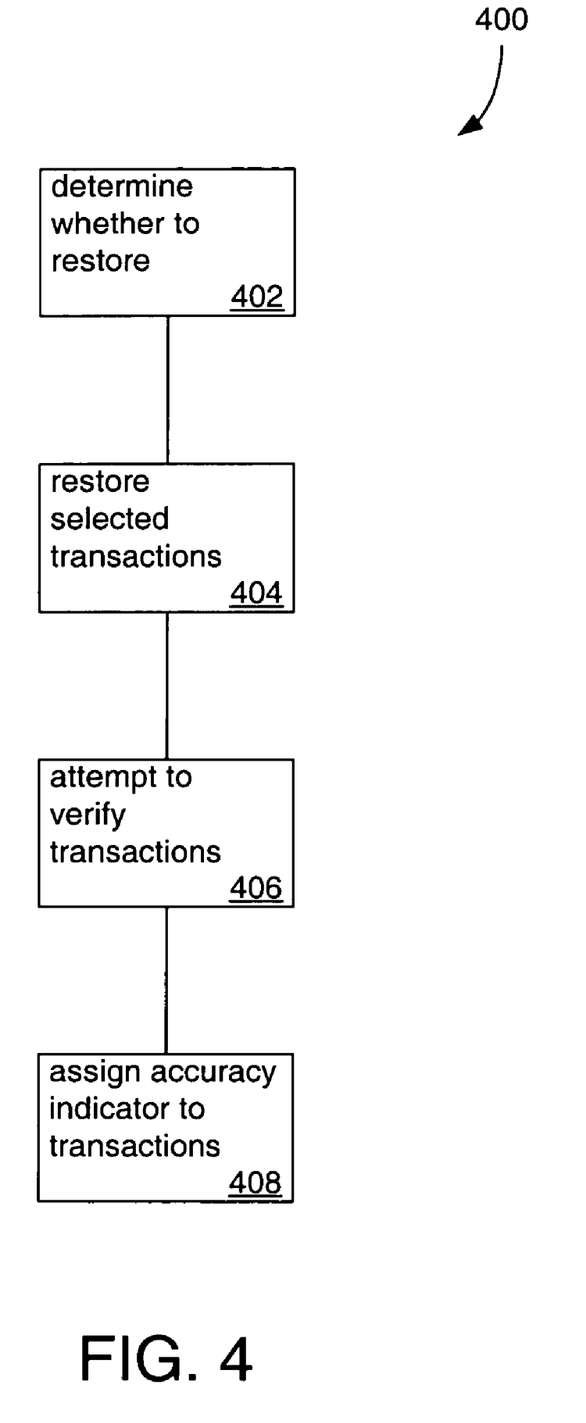
FIG. 4 illustrates a flowchart of a method for restoring lost transaction records in accordance with an embodiment of the present invention.

FIG. 4 illustrates a flowchart of a method 400 for restoring lost transaction records in accordance with an embodiment of the present invention. The method 400 may be performed at a content provider 102 (FIG. 1) and may be performed by a general purpose computer that operates in accordance with a stored software program that controls the computer to perform the steps of the method. Alternately, the method 400 may be performed by special purpose hardware and/or firmware may also include portions that are performed by human operators. For example, a decision as to whether to restore a particular transaction may be initially made according to the stored software program and then forwarded to a human operator for a final determination.

In a step 402 a determination is made as to whether to restore requested content. As mentioned, this determination may be based at least in part on the past history of the user making the request. In step 404, the selected transactions are restored according to the determination made in step 402. For example, if the determination of step 402 is to restore only certain ones of the claimed transactions, then the corresponding access rights are restored in step 404. In step 406, an attempt is made to verify the transactions. As mentioned, this may be accomplished by the content provider checking the logs of user's with whom the user making the claim has participated in the transactions. In step 408, an accuracy indicator is assigned to the claimed transactions. As mentioned, this may be used for making determinations (step 402) for future transactions.

Note that it is not necessary for these steps to be performed in the order shown in FIG. 4. For example, recall that other users that engage in transactions with the user U who is making the request periodically upload their transaction logs. If some or all of the users have done so before the user U makes the claim, then those transactions may be immediately verified.

Figure 5:
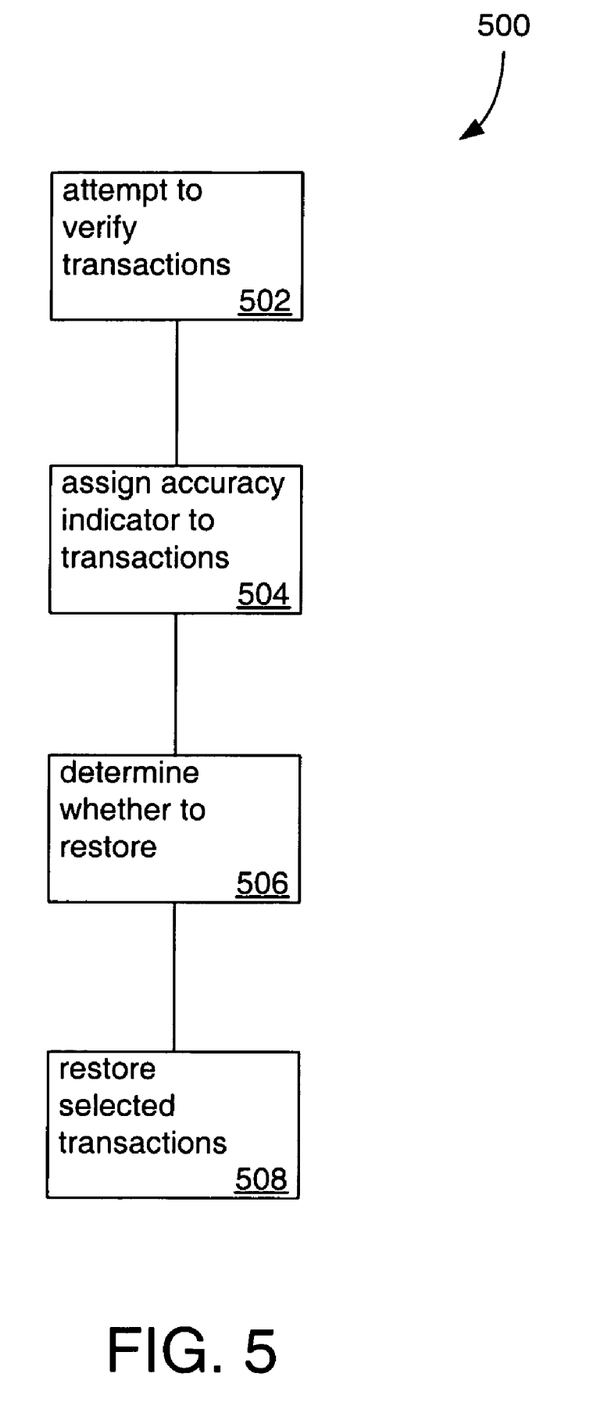
FIG. 5 illustrates a flowchart of an alternate method for restoring lost transaction records in accordance with an embodiment of the present invention.

FIG. 5 illustrates a flowchart of an alternate method 500 for restoring lost transaction records in accordance with an embodiment of the present invention. In step 502, an attempt is made to verify the transactions. As mentioned, this may be accomplished by the content provider checking the logs of user's with whom the user making the claim has participated in the transactions. Then, in step 504, an accuracy indicator is assigned to the claimed transactions. Here, the accuracy indicator is based at least in part on results of the step 502. In a step 506 a determination as to whether to restore requested content is made. This determination may be based at least in part on the accuracy indicator assigned in step 504, but may also be based on the past history) of the user making the request, e.g., by taking into account accuracy indicators of prior requests. In step 508, the selected transactions are restored according to the determination made in step 506.

In certain circumstances, the user U may have engaged in transactions with other users who have also lost their transaction log. Returning to the example in which user U buys content C1 from user U1, content C2 from user U2 and content C3 from the user U3, assume that the user U3 has also lost their transaction log (e.g., because user U3 has lost their media card or it has failed). However, assume also that the user U3 bought the content C3 from user U4 before selling it to the user U, that U4's transaction log can be found and that user U4's transaction log shows that U3 did, indeed, purchase the content C3. This means that the claim of the user U that it purchased the content C3 from the user U3 is plausible (i.e. it cannot be refuted) though the transaction cannot be verified directly by U3's transaction log. This referred to an indirect verification. In other words, the claim of the user U that they purchased access rights to the content C3 can be indirectly verified by the transaction log of the user U4.

Conversely, assume that U4's transaction log shows that U3 did not purchase the content C3 at a time that would have made it possible for U to have purchased the content C3 from the user U3. In this case, the user U's claim with respect to the transaction can be refuted as incorrect. Thus, indirect verification is based on the premise that the access rights acquired by each user comes from somewhere: either from the content provider itself, or from another user.

Where a transaction can be verified directly, an accuracy indicator of zero ("0") may be assigned to the transaction. Where a transaction can only be verified indirectly through one other user, as in the example above, an accuracy indicator of one ("1") may be assigned to the transaction. Assume, in the example above, that the user U4 had also lost their transaction log, that the user U3 had made a claim that they had purchased the content C3 from the user U4 and that the user U5's transaction log indicates that the user U4 had purchased the content C3 from the user U5 prior to the claimed transactions of the users U3 and U4. In this case, an accuracy indicator of two ("2") may be assigned to the transaction to indicate that the claim of the user U can only be verified indirectly though two other users (i.e. users U3 and U4). Similarly, accuracy factors of 3, 4, 5, etc. can be assigned where a transaction can only be indirectly verified through a corresponding number of other users.

Where a transaction is refuted, an accuracy indicator of "refuted" may be assigned to the transaction. Further, where the information needed to verify a transaction is not yet available an accuracy indicator of "pending" may be assigned to the transaction. In the example, where an attempt is being made to verify a purchase by the user U from the user U3 and the user U3 has not recently uploaded their transaction log, an indicator of "pending" may be assigned to the transaction until the user U3 is heard from (e.g., they upload their transaction log or make a claim that they, too, have lost their media card). Thus, "pending" and "refuted" transactions are unverified, in contrast to transactions that are verified directly or indirectly.

Table 1 shows an example of accuracy indicators being assigned to each of several claims for lost transactions made by a user:

TABLE 1

| Claimed Lost Content | Assigned Accuracy Indicator |
| --- | --- |
| C1 | 1 |
| C2 | 0 |
| C3 | 0 |
| C4 | refuted |
| C5 | 1 |
| C6 | 3 |
| C7 | 1 |
| C8 | pending |

For each transaction, a decision may be made as to whether to restore the content according to a predetermined policy, for example: (i) restore all content whose accuracy factor is 0; (ii) restore all content whose accuracy factor is 1 or greater or pending, only if the user is not black-listed; and (iii) if a number of claims (e.g., two or more) are proven wrong (refuted), then the user is black-listed. As another example, the policy may be as follows: (i) restore all content whose accuracy factor is 0 or 1; and (ii) restore all content whose accuracy factor is greater than 1 or pending, only if the user is not black-listed; and (iii) if two or more claims are proven wrong (refuted), then the user is black-listed. It will be apparent that different policies may be used.

The above examples in which a claim is indirectly verified require that the user making the claim be able to identify from whom the content was obtained. Thus, in order to be able to indirectly verify U's claim that content C3 was purchased from U3 where U3 transaction log is lost (i.e. by examining U4's transaction log to see that it sold the content to U3), the user U must be able identify U3 as the seller. In certain circumstances, the user U making a request for restoration of lost content may not be able to identify the other party to each transaction.

In this case, the method 500 of FIG. 5 may be performed. In step 502, an attempt is made to verify those transactions for which the user cannot identify the other party by checking transaction logs uploaded by other parties to see if any reported a matching transaction with the user making the claim. If so, an accuracy indicator of "0" may be applied to the transaction. For example, assume the transaction log of the user U is lost and the user U claims that they purchased content C3, but cannot remember from whom. Assume that the user U3 had uploaded their transaction log which indicates that the user U purchased the content C3 from the user U3. This directly verifies U's claim as to that transaction.

Then, in step 504, considering all the claims of user U1, a ratio of the number of claims verified as plausible with an accuracy factor "0" to the total number of transactions claimed can be calculated:

$R$=(number of claims plausible with an accuracy factor of zero)/(total number of claims)

In step 506, it may be decided whether to restore selected transactions based on the value of R. For example, a policy may be to trust the claims of the U if this ratio is above a certain predetermined value Rmin, for example 50% (half of the claims of user U can be verified, so we trust the user U). Further, past behavior of the user can be used to determine the level of trust given to U. For example, if U1 loses his media card a second time, Rmin can be increased to 75% and to 95% the third time. The level of Rmin may be adjusted to be lower than it otherwise would be where a user had a high level of R for a prior claim. Where the value of R is less than Rmin, only those transactions that can be directly verified may be restored.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method of responding to a demand for restoration of lost offline peer-to-peer transaction records comprising:
a content provider granting access rights to content;
engaging in transactions involving the access rights among peer devices while offline the content provider;
attempting to verify the transactions for a plurality of lost transaction records having been lost by a party to the transactions, through the peer device of another party to each of the corresponding transactions;
assigning an accuracy indicator to transactions of the plurality of lost transaction records wherein the accuracy indicator indicates whether the transaction is verified directly through another party to the corresponding transaction; and determining whether transaction records of the plurality should be restored based on the assigned accuracy indicators.

2. The method according to claim 1, wherein said lost transaction records include access rights to digital media.

3. The method according to claim 1, further comprising restoring selected ones of the lost transaction records.

4. The method according to claim 3, wherein said restoring comprises restoring only those transaction records that are verified directly.

5. The method according to claim 3, wherein said restoring comprises restoring at least one of the lost transaction records before the transaction is verified through the other party to the transaction.

6. The method according to claim 3, wherein said determining comprises receiving a log of transaction records from each other party to the transactions for the lost transaction records whose record of the transaction is not lost.

7. The method according to claim 6, wherein the accuracy indicator further indicates whether the transaction record for a transaction is verified indirectly through another party to the corresponding transaction.

8. The method according to claim 7, wherein the accuracy indicator indicates the number of parties through which the transaction is verified indirectly.

9. The method according to claim 7, wherein said restoring comprises restoring only those transaction records that are verified directly and those that are verified indirectly through one other party.

10. A method of responding to a demand for restoration of lost offline peer-to-peer transaction records comprising:
attempting to verify transactions for a plurality of lost transaction records through another party to the corresponding transaction, wherein said lost transaction records include access rights to digital media;
assigning an accuracy indicator to transactions of the plurality of lost transaction records wherein the accuracy indicator indicates whether the transaction is verified directly through another party to the corresponding transaction;
determining whether transaction records of the plurality should be restored based on the assigned accuracy indicators, wherein said determining is performed based on a ratio of a number of verified transactions to a number of lost transactions; and
restoring selected ones of the lost transaction records.

11. The method according to claim 10, wherein when the ratio exceeds a threshold, said restoring comprises restoring at least one of the lost transaction records before the transaction is verified through the other party to the transaction.

12. The method according to claim 10, wherein the ratio is of directly verified transactions to a number of lost transactions and when the ratio exceeds a threshold, said restoring comprises restoring at least one transaction that is not directly verified.

13. A method of responding to a demand for restoration of lost offline peer-to-peer transaction records comprising:
attempting to verify transactions for a plurality of lost transaction records through another party to the corresponding transaction, wherein said lost transaction records include access rights to digital media;
assigning an accuracy indicator to transactions of plurality of lost transaction records wherein the accuracy indicator indicates whether the transaction is verified directly through another party to the corresponding transaction;
determining whether transaction records of the plurality should be restored based on the assigned accuracy indicators, wherein said determining is further based on a history for the party making the demand; and restoring selected ones of the lost transaction records.

14. The method according to claim 13, wherein the history for the party indicates whether the party has made one or more previous demands for restoration of lost transaction records.

15. The method according to claim 13, wherein the history the party indicates verified and unverified transactions.

16. The method according to claim 15, wherein the unverified transactions include refuted transactions.

17. The method according to claim 15, wherein the unverified transactions include transactions for which a transaction log of another party to the transaction is unavailable.

18. The method according to claim 13, wherein the history for the party includes a ratio of a number of verified transactions to a number of lost transactions.

19. The method according to claim 18, wherein when the ratio exceeds a threshold, said restoring comprises restoring at least one of the lost transaction records before the transaction is verified through the other party to the transaction.

20. The method according to claim 18, wherein the ratio is of directly verified transactions to a number of lost transactions and when the ratio exceeds a threshold, said restoring comprises restoring at least one transaction that is not directly verified.

21. The method according to claim 15, wherein the party is blacklisted when the number of unverified transactions exceeds a threshold.

22. The method according to claim 21, wherein when the party is blacklisted, said restoring comprises restoring only those transaction records that are verified directly.

23. A content provider for responding to a demand for restoration of lost transaction records wherein the content provider receives a demand for restoration of lost peer-to-peer transaction records having been lost by a party to the transactions and the transactions involving access rights to content transacted among peer devices while offline from a content provider, the content provider having granted the access rights to the content, and wherein the content provider assigns an accuracy indicator to transactions of the plurality of lost transaction records based on attempts to verify transactions through the peer device of another party to each of the corresponding transactions, and determines whether to restore selected ones of the lost transaction records based on the assigned accuracy indicators.

24. A program storage device readable by a machine, tangibly embodying a program of instructions executable by the machine to perform method steps for responding to a demand for restoration of lost peer-to-peer transaction records comprising:
receiving a demand for restoration of lost peer-to-peer transaction records having been lost by a party to the transactions and the transactions involving access rights to content transacted among peer devices while offline from a content provider, the content provider having granted the access rights to the content;
attempting to verify transactions for a plurality of lost transaction records through the peer device of another party to each of the corresponding transactions;

assigning an accuracy indicator to transactions of the plurality of lost transaction records wherein the accuracy indicator indicates whether the transaction is verified directly through another party to the corresponding transaction; and determining whether transaction records of the plurality should be restored based on the assigned accuracy indicators.

25. The program storage device according to claim 24, wherein said lost transaction records include access rights to digital media.

26. The program storage device according to claim 24, the method steps further comprising restoring selected ones of the lost transaction records.

27. The program storage device according to claim 26, wherein said determining is performed based on a ratio of a number of verified transactions to a number or lost transactions.

28. The program storage device according to claim 26, wherein said determining is further based on a history for the party making the demand.

* * * * *

UNITED STATES PATENT AND TRADEMARK OFFICE
CERTIFICATE OF CORRECTION

PATENT NO. : 7,287,078 B2
APPLICATION NO. : 10/714379
DATED : October 23, 2007
INVENTOR(S) : Salil Pradhan et al.

It is certified that error appears in the above-identified patent and that said Letters Patent is hereby corrected as shown below:

In column 5, line 42, after "device" delete "196" and insert -- 106 --, therefor.

In column 8, line 61, in Claim 1, after "offline" insert -- from --.

In column 9, line 66, in Claim 13, after "transactions of" insert -- the --.

In column 10, line 13, in Claim 15, after "history" insert -- for --.

In column 12, line 6, in Claim 27, delete "or" and insert -- of --, therefor.

Signed and Sealed this

Seventeenth Day of November, 2009

David J. Kappos
*Director of the United States Patent and Trademark Office*